United States Patent
Trifonov et al.

(10) Patent No.: US 9,003,096 B2
(45) Date of Patent: Apr. 7, 2015

(54) SERIAL INTERFACE

(75) Inventors: Dimitar T. Trifonov, Vail, AZ (US);
Marco A. Gardner, Tucson, AZ (US);
Joe G. Di Bartolomeo, Vaughan (CA)

(73) Assignee: Texas Instruments Incorporated, Dallas, TX (US)

( * ) Notice: Subject to any disclaimer, the term of this patent is extended or adjusted under 35 U.S.C. 154(b) by 508 days.

(21) Appl. No.: 13/049,694

(22) Filed: Mar. 16, 2011

(65) Prior Publication Data
US 2012/0239841 A1    Sep. 20, 2012

(51) Int. Cl.
*G06F 13/14*    (2006.01)
*G06F 13/42*    (2006.01)

(52) U.S. Cl.
CPC .................................. *G06F 13/4282* (2013.01)

(58) Field of Classification Search
USPC .......................................... 710/305–306, 110
See application file for complete search history.

(56) References Cited

U.S. PATENT DOCUMENTS

| | | | |
|---|---|---|---|
| 5,862,354 A | 1/1999 | Curiger et al. | |
| 7,085,863 B2 * | 8/2006 | Barenys et al. | 710/104 |
| 7,099,970 B1 * | 8/2006 | Foegelle et al. | 710/110 |
| 7,103,008 B2 | 9/2006 | Greenblat et al. | |
| 7,587,539 B2 | 9/2009 | Picard et al. | |
| 7,802,036 B2 | 9/2010 | Takeuchi | |
| 8,332,556 B2 * | 12/2012 | Woo et al. | 710/100 |
| 2002/0018513 A1 * | 2/2002 | Curry et al. | 374/178 |
| 2002/0083255 A1 * | 6/2002 | Greeff et al. | 710/305 |
| 2005/0097255 A1 * | 5/2005 | Barenys et al. | 710/316 |
| 2008/0215780 A1 | 9/2008 | Deshpande et al. | |
| 2009/0113094 A1 * | 4/2009 | Ludewig et al. | 710/100 |
| 2011/0153888 A1 * | 6/2011 | Sun et al. | 710/107 |
| 2011/0302344 A1 * | 12/2011 | Bell et al. | 710/110 |

* cited by examiner

*Primary Examiner* — Tim T Vo
*Assistant Examiner* — Kim T. Huynh
(74) *Attorney, Agent, or Firm* — Alan A. R. Cooper; Frank D. Cimino

(57) ABSTRACT

A method is provided. A communication is received by an input pin of an IC over a single-wire bus, where the communication includes a command byte. If the command byte is an initialization command byte, a self-addressing operation is performed to identify a bus address for the IC. Alternatively, if the command byte is a data movement command byte, a data movement operation is performed. When data movement operation is performed, the bus interface of the IC is set from the transparent mode to the operational mode if an operation address from the command byte matches the bus address so that a register identified in the command byte can be accessed and data movement with the register can be performed.

31 Claims, 4 Drawing Sheets

SERIAL INTERFACE

TECHNICAL FIELD

The invention relates generally to a serial interface and, more particularly, to a one- or two-wire serial interface.

BACKGROUND

Currently, there are several different one- and two-wire interface definitions, such as Inter-Integrated Circuit (I²C), System Management Bus (SMBus), SensorPath, and Universal Asynchronous Receiver/Transmitter (UART). Each of these interfaces, however, suffer from several common drawbacks. Multiple identical devices usually cannot be coupled "on" the bus at the same time. The host controller (master) usually addresses the slaves on the bus so each slave has a unique "bus address" so as to access each slave individually. This is normally achieved by using different device variances with different factory trimmed bus addresses, by using address pins on the devices, or by using special "address assignment protocols" (like in the SMBus). Additionally, issuing alerts by the slaves to the master controller usually requires additional pins and connecting wires. Therefore, there is a need for a serial interface that addresses the shortcomings of other conventional serial interfaces.

Some examples of conventional designs are: U.S. Pat. Nos. 5,862,354; 7,099,970; 7,103,008; 7,587,539; 7,802,036; and U.S. Patent Pre-Grant Publ. No. 2008/0215780.

SUMMARY

A preferred embodiment of the present invention, accordingly, provides an integrated circuit (IC). The IC comprises an input pin that is adapted to be coupled to a single-wire bus; an output pin that is adapted to be coupled to the bus; a bus interface that is coupled between the input pin and the output pin, wherein the bus interface has a transparent mode and an operational mode; and interface circuitry that is coupled to bus interface, wherein the interface circuitry is adapted to receive communications from the bus in both the transparent mode and the operational mode, and wherein the interface circuitry, upon receiving an initialization command byte, performs a self-addressing operation to identify a bus address for the IC, and wherein the interface circuitry, upon receiving a data movement command byte, sets the bus interface to operational mode, if an operation address associated with the data movement command matches the bus address, and performs a data movement.

In accordance with a preferred embodiment of the present invention, the bus interface further comprises: a first communication channel that is coupled to the input pin and the interface circuitry; a second communication channel that is coupled to the interface circuitry; a switch that is coupled to the first communication channel, the second communication channel, and the output pin, wherein the switch couples the first communication channel to the output pin in transparent mode, and wherein the switch couples the second communication channel to the output pin in operational mode.

In accordance with a preferred embodiment of the present invention, the IC further comprises functional circuitry that is coupled to the interface circuitry.

In accordance with a preferred embodiment of the present invention, the interface circuitry further comprises: a state machine that is coupled to the bus interface, the switch, and the functional circuitry; a configuration register that is coupled to the state machine; an address register that is coupled to the state machine; and a register bank that is coupled to the state machine, wherein the state machine is adapted to store data from the functional circuitry in the register bank.

In accordance with a preferred embodiment of the present invention, the interface circuitry is adapted to set the bus to the operational mode and transmit an alert when the bus is free.

In accordance with a preferred embodiment of the present invention, the data movement command byte is a read/write command byte comprising: an individual/global bit; an IC address field that includes the operation address; a register pointer field; and a read/write bit.

In accordance with a preferred embodiment of the present invention, the single-wire bus further comprises a single-wire data bus, and wherein the IC further comprises a clock pin that is adapted to be coupled to a single-wire clock bus.

In accordance with a preferred embodiment of the present invention, the functional circuitry further comprises a temperature sensor, and wherein the register bank further comprises: a temperature result register; a sensor configuration register; a low temperature threshold register; and a high temperature threshold register.

In accordance with a preferred embodiment of the present invention, a method is provided. The method comprises receiving a communication by an input pin of an IC over a single-wire bus, wherein the communication includes a command byte; if the command byte is an initialization command byte, performing a self-addressing operation to identify a bus address for the IC; and if the command byte is a data movement command byte, performing a data movement operation, wherein the data movement operation includes the steps of: if an operation address from the command byte matches the bus address, setting the bus interface of the IC from the transparent mode to the operational mode; accessing a register identified in the command byte; and performing data movement with the register.

In accordance with a preferred embodiment of the present invention, the self-addressing operation further comprises: determining the bus address from the communication; storing the bus address; generating a modified bus address; setting a bus interface of the IC from a transparent mode to an operational mode; and transmitting the modified address through an output pin of the IC.

In accordance with a preferred embodiment of the present invention, the method further comprises: determining that an alert condition is present; waiting for the bus to become free; setting the bus interface of the IC from the transparent mode to the operational mode when the bus is free; and transmitting an alert over the bus in response to the alert condition.

In accordance with a preferred embodiment of the present invention, the method further comprises: receiving an alert clear; resetting internal registers; and receiving a baud calibration byte.

In accordance with a preferred embodiment of the present invention, a system is provided. The system comprises a single-wire bus; a master controller that is coupled to the bus, wherein the controller is adapted to transmit communications over the bus and to receive data from the bus, and wherein each communication includes a command byte; a plurality of slave ICs that are coupled in series with one another along the bus, wherein each slave IC includes: an input pin that is coupled to the bus; an output pin that is coupled to the bus; a bus interface that is coupled between the input pin and the output pin, wherein the bus interface has a transparent mode and an operational mode; and interface circuitry that is coupled to bus interface, wherein the interface circuitry is adapted to receive communications from the bus in both the transparent mode and the operational mode, and wherein the interface circuitry, upon receiving an initialization command byte, performs a self-addressing operation to identify a bus address for the IC, and wherein the interface circuitry, upon receiving a data movement command byte, sets the bus interface to operational mode, if an operation address associated with the data movement command matches the bus address, and performs a data movement.

In accordance with a preferred embodiment of the present invention, the bus interface further comprises: a first communication channel that is coupled to the input pin and the interface circuitry; a second communication channel that is coupled to the interface circuitry; a switch that is coupled to the first communication channel, the second communication channel, and the output pin, wherein the switch couples the first communication channel to the output pin in transparent mode, and wherein the switch couples the second communication channel to the output pin in operational mode.

In accordance with a preferred embodiment of the present invention, an apparatus is provided. The apparatus comprises means for receiving a communication by an input pin of an IC over a single-wire bus, wherein the communication includes a command byte; mean for performing a self-addressing operation to identify a bus address for the IC if the command byte is an initialization command byte; and means for performing a data movement operation if the command byte is a data movement command byte, wherein the data movement operation includes: means for setting the bus interface of the IC from the transparent mode to the operational mode if an operation address from the command byte matches the bus address; means for accessing a register identified in the command byte; and means for performing data movement with the register.

In accordance with a preferred embodiment of the present invention, the means for performing self-addressing operation further comprise: means for determining the bus address from the communication; means for storing the bus address; means for generating a modified bus address; means for setting a bus interface of the IC from a transparent mode to an operational mode; and means for transmitting the modified address through an output pin of the IC.

In accordance with a preferred embodiment of the present invention, the apparatus further comprises: means for determining that an alert condition is present; means for waiting for the bus to become free; means for setting the bus interface of the IC from the transparent mode to the operational mode when the bus is free; and means for transmitting an alert over the bus in response to the alert condition.

In accordance with a preferred embodiment of the present invention, a method is provided. The method comprises: receiving a communication by an input pin for each of a plurality of ICs over a single-wire bus, wherein the communication includes a data movement command as its command byte; accessing a register in each of the plurality of ICs identified in the command byte; and performing data movement with the register for each of the plurality of ICs in an order.

In accordance with a preferred embodiment of the present invention, the single-wire bus is a unidirectional bus that forms a ring that includes each of the plurality of ICs and a host controller, and wherein the step of performing further comprises performing data movement with the register for each of the plurality of ICs in a sequence that corresponds to an address on the ring.

In accordance with a preferred embodiment of the present invention, the data movement is a read operation.

In accordance with a preferred embodiment of the present invention, the single-wire bus is a bi-directional data bus, and wherein the method further comprises transmitting a clock signal across a clock bus to each of the plurality of ICs from a host controller.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
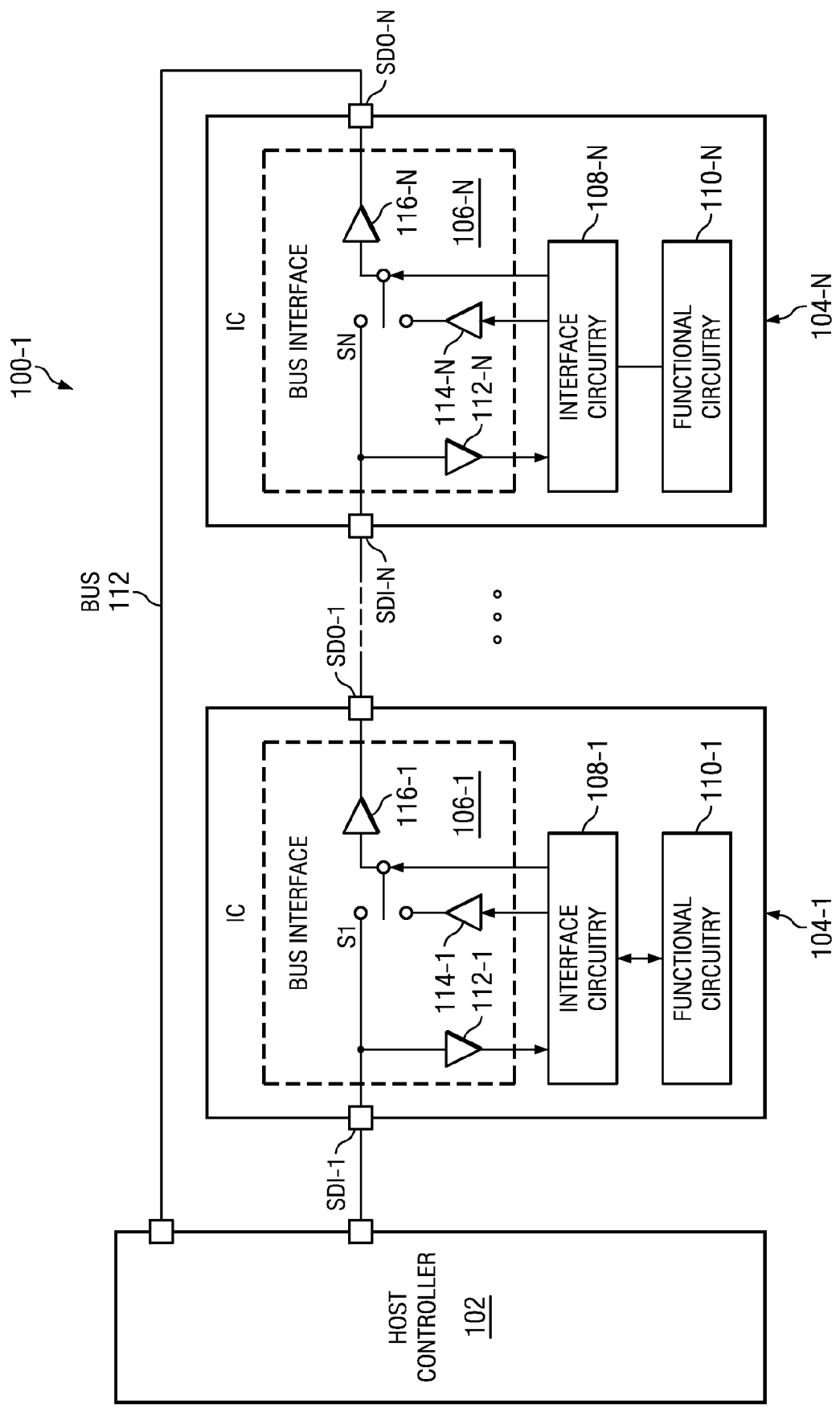
FIGS. 1-4 are examples systems in accordance with a preferred embodiment of the present invention.

Refer now to the drawings wherein depicted elements are, for the sake of clarity, not necessarily shown to scale and wherein like or similar elements are designated by the same reference numeral through the several views.

Referring to FIG. 1, the reference numeral 100-1 generally designates a system in accordance with a preferred embodiment of the present invention. The system generally comprises a host controller 102 (which generally functions as a master device), integrated circuits (ICs) 104-1 to 104-N (which generally function as slaved devices), a single-wire bus 112 (which is generally coupled to the host controller 102 and each slave IC 104-1 to 104-N to form a ring in this example and which is generally a unidirectional bus). Each IC 104-1 to 104-N generally and respectively comprises an input pin SDI-1 to SDI-N, an output pin SDO-1 to SDO-N, a bus interface 106-1 to 106-N, interface circuitry 108-1 to 108-N, and functional circuitry 110-1 to 110-N (such as a temperature sensor). Each bus interface 106-1 to 106-M generally comprises a buffer 116-1 to 116-N, a switch S1 to SN, an input communication channel (i.e., a channel coupled to its respective switch S1 to SN and buffer 112-1 to 112-N), and an output communication channel (i.e., a channel coupled to its respective switch S1 to SN through buffer 114-1 to 114-N).

Figure 2:
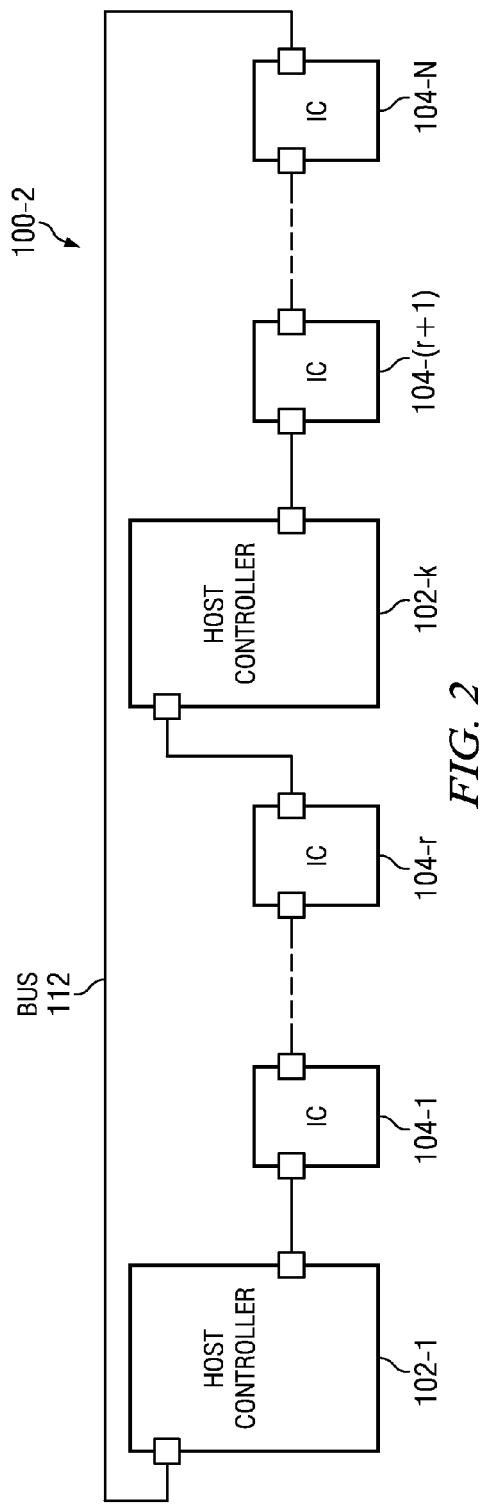

The configuration of each of the ICs 104-1 to 104-N allows each of the ICs 104-1 to 104-N to have an operational mode and a transparent mode, where the bus 112 can be monitored in either mode. Often, in conventional system, when slave devices (i.e., ICs 104-1 to 104-N) are coupled in series on a bus (forming a ring), the bus does not remain "intact";

instead, the slave devices routinely "break" the ring in order to communicate. In transparent mode, interface circuitry 108-1 to 108-N couples its input pin SDI-1 to SDI-N to its output pin SDO-1 to SDO-N through its switch S1 to SN, while not interfering with the interface circuitry's 108-1 to 108-N ability to monitor bus 112 because the interface circuitry 108-1 to 108-N is coupled to its input pin SDI-1 to SDI-N through its buffer 112-1 to 112-N. In operational mode, the switch S1 to SN is actuated to allow its interface circuitry 108-1 to 108-N to communicate with the host controller 102. Thus, ICs 104-1 to 104-N allow the bus 112 to remain "intact" while not interfering with the host controller's 102 ability to communicate with each IC 104-1 to 104-N individually. It may also be possible to include multiple hosts (i.e., hosts 102-1 to 102-k of system 100-2 of FIG. 2) within a bus (which forms a ring) so long as each host includes a bus interface (i.e., similar to bus interface 106-1 to 106-N) having transparent and operational modes.

Figure 4:
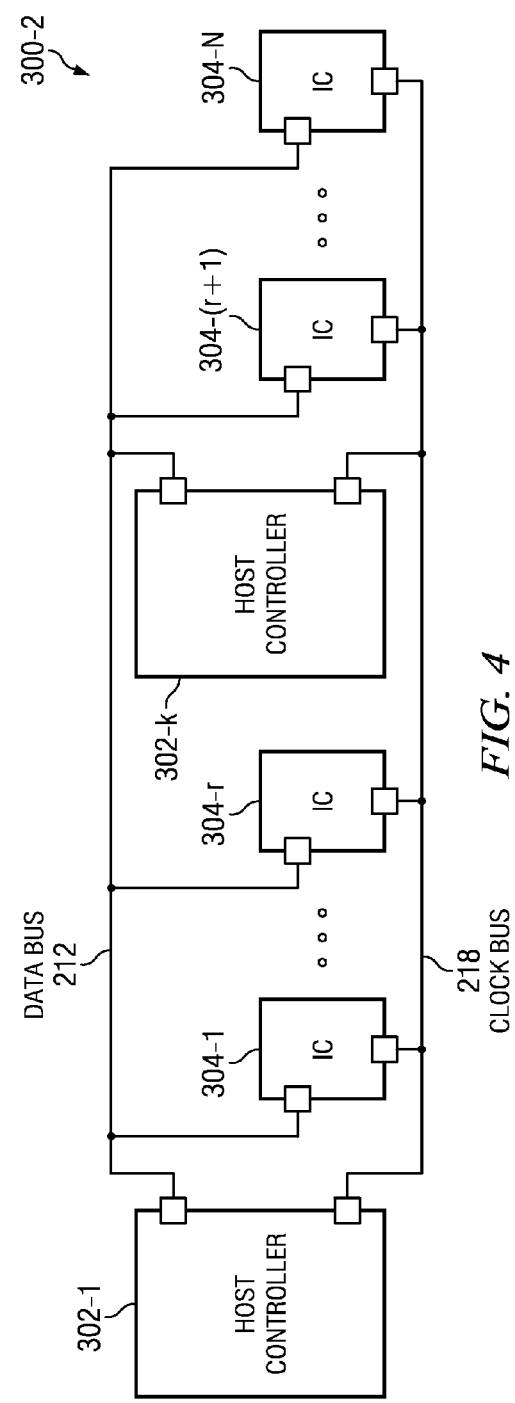
Figure 3:
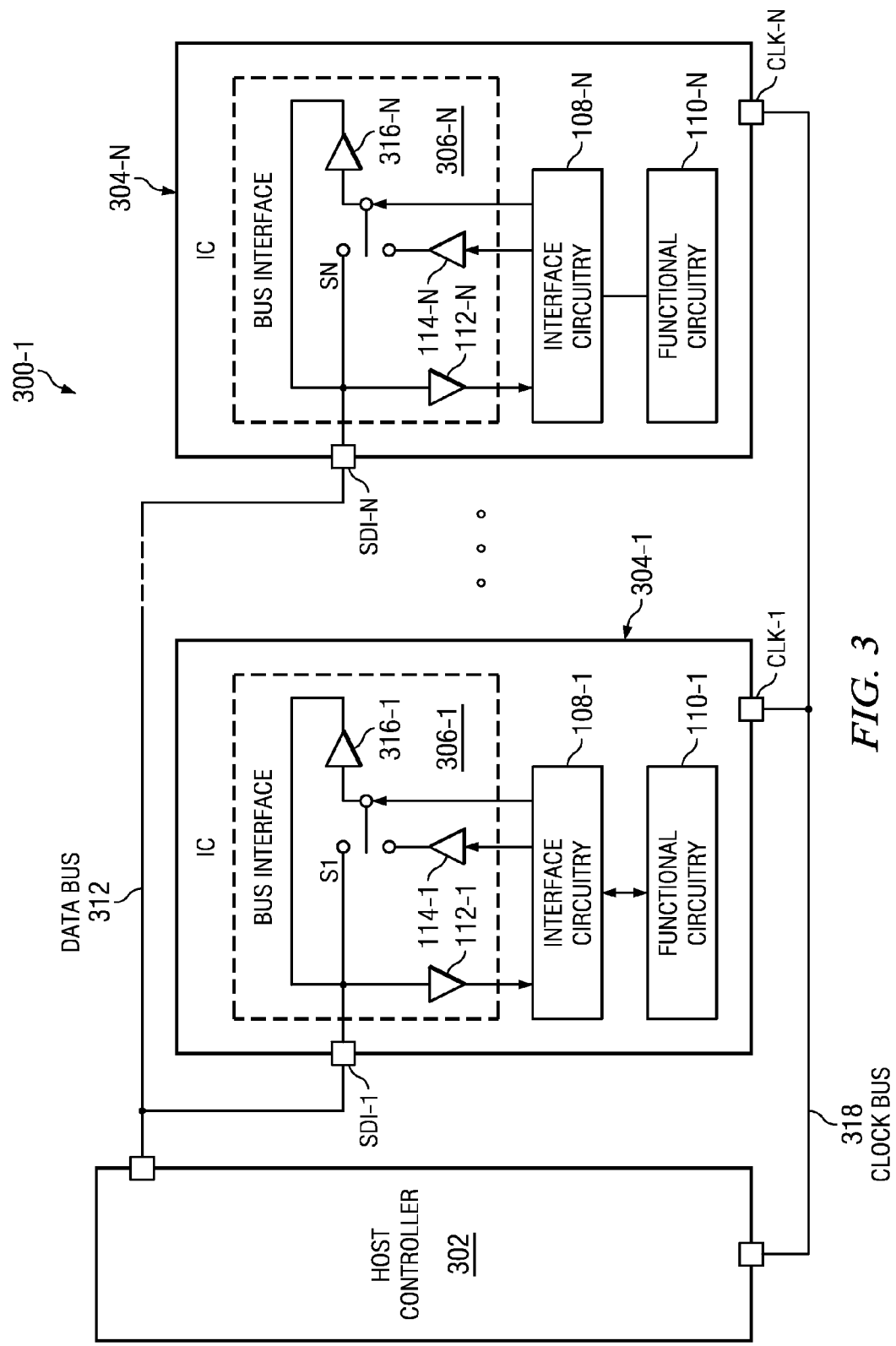

As an alternative and as shown in FIG. 3, the ICs 104-1 to 104-N can be configured to be used with a two-wire bus system (i.e., I²C); these ICs are labeled as 304-1 to 304-N. In this example, there is a data bus 312 (i.e., SDA for an I²C bus system) and a clock bus 318 (i.e., SCL for I²C bus system). Typically, this data bus 312 is a bi-directional bus. Each of the busses 312 and 318 is coupled separately between the host controller 302 and ICs 304-1 to 304-N, and in order to allow this configurations, the data output pins SDO-1 to SDO-N of ICs 104-1 to 104-N are replaced with clock pins CLK-1 to CLK-N of ICs 304-1 to 304-N. As with system 100-1, system 300-1 can be reconfigured to include multiple hosts (i.e., hosts 302-1 to 302-k of system 300-2 of FIG. 4). Additionally, in the configurations of FIGS. 3 and 4, the buffers 316-1 to 316-N of bus interfaces 306-1 to 306-N function as output buffers, and these output buffers 316-1 to 316-N could be open drain output buffers.

Figure 5:
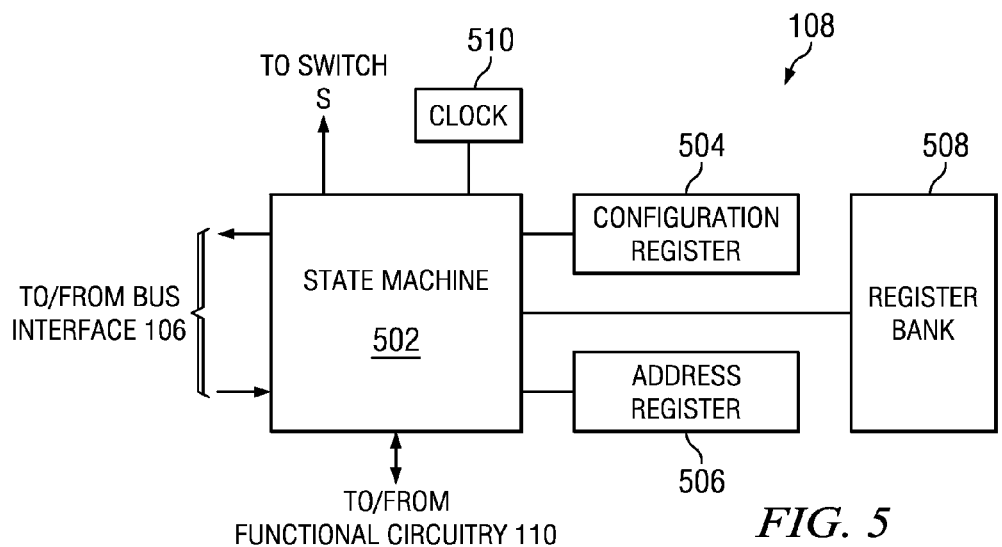
FIG. 5 is an example of the interface circuitry of FIGS. 1 and 3.
Figure 6:
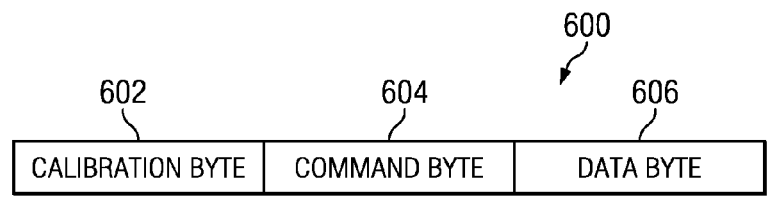
FIG. 6 is an example of a communication transmitted by the host controller of FIGS. 1-4.
Figure 7:
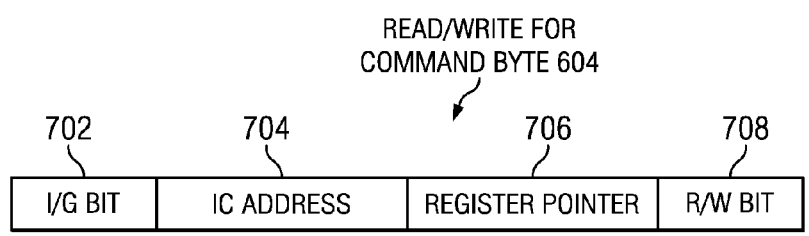
FIG. 7 is an example of a read/write for the command byte of FIG. 3.
Figure 8:
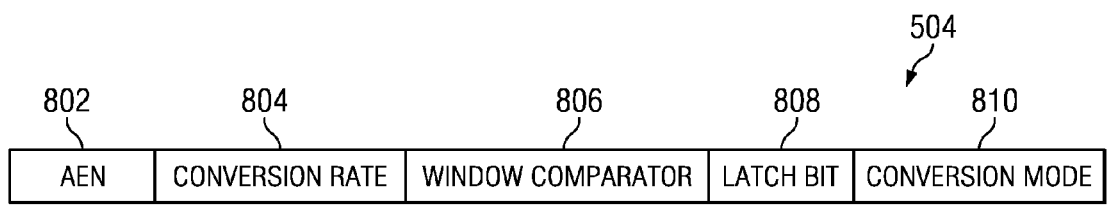
FIG. 8 is an example of the configuration for the configuration register of FIG. 5.

Turning back to FIG. 1, in order to allow for the transparent and operational modes, the interface circuitry 108-1 to 108-N (hereinafter 108 and which can be seen in FIG. 5) and communications to/from the host controller 102 (as shown in FIGS. 7 and 8) are generally configured to allow for self-addressing and data movement (read/write) operations. The interface circuitry 108 generally comprises a state machine 502, a configuration register 504, an address register 506, a register bank 508, and a clock 510. The state machine 502 is generally in communication with the bus 112 (and the host controller 102) so that it can decode communications 600 from the host controller 102. Each communication 600 is generally comprised of a configuration byte 602, a command byte 604, and a data byte 606 (which can each be, for example, 8 bits or 16 bits).

Looking first to the self-addressing operation, the ICs 104-1 to 104-N can address themselves automatically in response to an initialization command byte (as the command byte 604). ICs 104-1 to 104-N each have a default address stored in its address register 506 (which can, for example, be a 4-bit register to allow for addressing of 16 ICs). When the host controller 102 issues a communication 600 that includes an initialization command byte as byte 604, there is also an initial address sent as part of the data byte 606 (i.e., "0000"). All ICs 104-1 to 104-N receive this communication 600 with the initialization command byte, which allows all ICs 104-1 to 104-N enter into operational mode thereafter. Upon entering this operational mode, the first IC (i.e., 104-1) will receive and store the initial address sent as part of the data byte 606 into its address register 506. Once the address is stored, the state machine 502 modifies the initial address (i.e., increments the address), transmits the data byte 606 with the modified address to the next IC (i.e., 104-2), and set the switch (hereinafter S) to transparent mode. This process continues until each IC (i.e., 104-1) on bus 112 has an address. The final IC (i.e., 104-N) transmits the final modified address to the host controller 102, which allows the host controller 102 to know the address of each IC (i.e., 104-1) and the number of IC on bus 112.

Once the addresses of the ICs (i.e., 104-1) are set, functional data can be communicated across bus 112. As stated above, each of the ICs 104-1 to 104-N includes functional circuitry 110-1 to 110-N (hereinafter 110), which can perform a variety of tasks. The task performed by the functional circuitry 110 can dictate the configuration of the register bank 508. For example, functional circuitry 110 can be a temperature sensor, and the register back 508 can be comprised of a temperature result register (that can be read-only by the host controller 102), a configuration register, a low temperature threshold register, and a high temperature threshold register. The host controller 102 can then access (read and/or write) the data stored within these registers by using a read/write byte as command byte 604.

Turning to FIG. 7, an example of a read/write byte for command byte 604 can be seen. This read/write byte generally comprises an Individual/Global (I/G) bit 702, and IC address 704, a register pointer 706, and a read/write (R/W) bit 708. When idle, ICs 104-1 to 104-N are, by default, generally in transparent mode. When the host controller 102 transmits a communication 600 that includes a read/write command, each of the ICs 104-1 to 104-N can perform the read or write operation indicated by the communication 600. There are generally two types of read/write access (individual and global) that are indicated by the I/G bit 402.

Looking first to the individual read/write access, this read/write access allows the host controller 102 to perform a read/write access on a desired IC (i.e., 104-1) on bus 112. When the I/G bit 702 is set to individual (i.e., "0"), the host supplies an IC address 704 (which is typically 4 bits) and a register pointer 706 (which is typically 2 bits), and a R/W bit 708 (where "1" can reflect a read and "0" can reflect a write). As an example, if the functional circuitry 110 for IC 104-1 (with an address of "0000") is assumed to be a temperature sensor so that register bank 508 includes a temperature result register (pointer "00"), a configuration register (pointer "01"), a low temperature threshold register (pointer "10"), and a high temperature threshold register (pointer "11"), the communication 600 for a read of the temperature result register would be as follows: 00000001. When the host controller 102 issues the communication 600 with a read/write access, it is transmitted across the bus 112 until the IC (i.e. 104-1) with the associated address receives the communication 600. Once received, the IC (i.e., 104-1) with the associated address enters operational mode (for read access), performs the desired read/write access, and returns to transparent mode. For write accesses, the IC (i.e., 104-1) with the associated address remains in transparent mode.

Global read/write accesses, on the other hand, are somewhat different individual read/write addresses for both system 100-1/100-2 and 300-1/300-2. Namely, with global read/write accesses, all ICs 104-1 to 104-N or 304-1 to 304-N are accessed at about the same time. Generally, a bit pattern for the IC address 704 can be preprogrammed or predetermined (i.e., "1110"). As an example, if each of ICs 104-1 to 104-N are temperature sensors (having the register pointer configuration described in the example above), host controller 102 can issue a global read to the low temperature threshold register command byte 604 having the following configuration: 11110100. When the host controller 102 or 302 issues a global read command (as part of the command byte 604), the first IC (i.e., 104-1) typically transmits its data first with each of the remaining ICs (i.e., 104-2 to 104-N) following in order of position on the ring or chain so as to not create conflicts on bus 112. This same process can be followed for the two-wire bus of system 300-1/300-2, meaning that for an I²C system, each slave (i.e., 204-1 to 204-N) could be accessed substantially simultaneously, placing data on bus 312 in a sequential manner or in order of their bus addresses.

In addition to self-addressing and read/write accesses, ICs 104-1 to 104-N allow for interrupt commands to be issued without "breaking" in the bus 112 and interrupting communications with other ICs. During normal operation, alert conditions (i.e., temperature exceeds the high temperature threshold specified in a high temperature threshold register) may exist. In conventional systems, interrupts would normally "break" the bus 112 upon reaching an alert condition, interfering with the ability of other ICs' to communicate. Because ICs 104-1 to 104-N can operate in a transparent mode, an IC (i.e., 104-1) with an alert condition present can remain in transparent mode until the bus 112 becomes free, at which time the IC (i.e., 104-1) can enter operational mode ("breaking" the bus after a delay) so as to transmit the interrupt to host controller 102. As an example, this interrupt can be a pulse of a predetermined length. Once the host controller 102 receives the interrupt signal, it issues a communication 600 with an alert clear as the command byte 604. This alert clear command can then propagate through bus 112, clearing each IC (i.e., IC. 104-1 to 104-N) with an alter condition present. Typically, this alert clear command resets the internal registers for each of ICs 104-1 to 104-N but does not affect the addresses, and, upon resetting the internal registers, the IC (i.e., IC. 104-1 to 104-N) with an alter condition present enters transparent mode and can place data on the bus related to the alert condition (i.e., address, limits violated, and so forth). Alternatively, host 102 can independently issue an alert clear for each IC (i.e., IC. 104-1 to 104-N) with an alert condition present instead of a blanket command for all.

Turning now to FIG. 8, an example of the arrangement for the configuration register 504 can be seen in greater detail. The configuration register 504 generally comprises an alert enable (AEN) field 802, a conversion rate field 804, a window comparator field 806, a latch bit field 808, and a conversion mode field 810. The AEN field 802 generally enables an IC (i.e., 104-1) to generate the interrupt (as described above). The conversion rate field 804 and conversion mode field 810 are typically two bits each and generally indicate the conversion rate (i.e., between about 0.25 Hz and 8 Hz) and the conversion mode (i.e., shut down, single shot, and continuous conversion). The window comparator field 806 generally includes flags that correspond to alert conditions (i.e., temperature exceeds the high temperature threshold specified in a high temperature threshold register) so that the flag can be set upon occurrence of the alert condition. Finally, the latch mode bit field 808 can indicate when the flags from the window comparator field 806 can be cleared (i.e., when the host 102 issues an alert clear or upon a return to a non-alert condition state like temperature falling below the high temperature threshold).

Additionally, hosts (i.e., 102) can perform a "speed" or "baud" calibration. This baud calibration allows communications to occur at a number of rates (i.e., between 4.8 Kbps and 114 Kbps). This can be accomplished through the transmission of a baud rate byte (as part of communication 600), which can, for example, occur at initialization, after an alert clear, or with every communication 600.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:
1. An integrated circuit (IC) comprising:
   an input pin that is adapted to be coupled to a single-wire bus;
   an output pin that is adapted to be coupled to the single-wire bus;
   a bus interface that is coupled between the input pin and the output pin, wherein the bus interface has a transparent mode and an operational mode; and
   a plurality of interface circuitries which are coupled in series from an output of the bus bus interface in a return loop to an input of the bus interface,
   wherein the bus interface is configured to assign a bus address to a first interface circuitry of the plurality of interface circuitries, and
   wherein each interface circuitry is adapted to:
   a) increment the value of a received bus address, and then convey that incremented value to a next interface circuitry and assigns that value to the next interface series-coupled interface circuitry,
   b) wherein each of the serially-coupled individually assigned interfaces is configured to receive communications from the bus in both the transparent mode and the operational mode, wherein the transparent and configurations modes are determined by comparing a communication signal to the incremented values of the received address.

2. The IC of claim 1, wherein the IC further comprises functional circuitry that is coupled to the interface circuitry.

3. The IC of claim 2, wherein the interface circuitry further comprises:
   a state machine that is coupled to the bus interface, the switch, and the functional circuitry;
   a configuration register that is coupled to the state machine;
   an address register that is coupled to the state machine; and
   a register bank that is coupled to the state machine, wherein the state machine is adapted to store data from the functional circuitry in the register bank.

4. The IC of claim 3, wherein the interface circuitry is adapted to set the bus to the operational mode and transmit an alert when the bus is free.

5. The IC of claim 4, wherein the data movement command byte is a read/write command byte comprising:
   an individual/global bit;
   an IC address field that includes the operation address;
   a register pointer field; and
   a read/write bit.

6. The IC of claim 5, wherein the single-wire bus further comprises a single-wire data bus, and wherein the IC further comprises a clock pin that is adapted to be coupled to a single-wire clock bus.

7. The IC of claim 5, wherein the functional circuitry further comprises a temperature sensor, and wherein the register bank further comprises:
   a temperature result register;
   a sensor configuration register;
   a low temperature threshold register; and
   a high temperature threshold register.

8. The apparatus of claim 1, wherein the interface circuitry, upon receiving an initialization command byte, performs a self-addressing operation to identify a bus address for the IC, and
wherein the interface circuitry, upon receiving a data movement command byte, sets the bus interface to operational mode, if an operation address associated with the data movement command matches the bus address, and performs a data movement,
wherein the bus interface further comprises:
a first communication channel that is coupled to the input pin and the interface circuitry;
a second communication channel that is coupled to the interface circuitry; and
a switch that is coupled to the first communication channel, the second communication channel, and the output pin,
wherein the switch couples the first communication channel to the output pin in transparent mode, and
wherein the switch couples the second communication channel to the output pin in operational mode.

9. The IC claim 1, wherein the interface circuitry is configured to receive communications from the bus in both the transparent mode and the operational mode, and
wherein the interface circuitry, upon receiving an initialization command byte, performs a self-addressing operation to identify a bus address for the IC, and
wherein the interface circuitry, upon receiving a data movement command byte, sets the bus interface to operational mode, if an operation address associated with the data movement command matches the bus address, and performs a data movement,
wherein the bus interface further comprises:
a first communication channel that is coupled to the input pin and the interface circuitry;
a second communication channel that is coupled to the interface circuitry; and
a switch that is coupled to the first communication channel, the second communication channel, and the output pin,
wherein the switch couples the first communication channel to the output pin in transparent mode, and
wherein the switch couples the second communication channel to the output pin in operational mode.

10. A method comprising:
receiving a communication by an input pin of an IC over a single-wire bus, wherein the communication includes a command byte;
if the command byte is an initialization command byte, performing a self-addressing operation to identify a bus address for the IC; and
if the command byte is a data movement command byte, performing a data movement operation, wherein the data movement operation includes the steps of:
if an operation address from the command byte matches the bus address, setting the bus interface of the IC from transparent mode to an_operational mode;
accessing a register identified in the command byte; and performing data movement with the register,
the IC having a plurality of, circuitries coupled in series from an output of the bus bus interface in a return loop to an input of the bus interface,
wherein the bus interface is configured to assign a bus address to a first interface circuitry of the plurality of interface circuitries, and wherein each interface circuitry is adapted to:
a) increment the value of a received bus address, and then convey that incremented value to a next interface circuitry and assigns that value to the next interface series-coupled interface circuitry,
b) wherein each of the serially-coupled individually assigned interfaces is configured to receive communications from the bus in both the transparent mode and the operational mode, wherein the transparent and configurations modes are determined by comparing a communication signal to the incremented values of the received address.

11. The method of claim 10, wherein the self-addressing operation further comprises:
determining the bus address from the communication;
storing the bus address;
generating a modified bus address;
setting a bus interface of the IC from a transparent mode to an operational mode; and
transmitting the modified address through an output pin of the IC.

12. The method of claim 11, wherein the method further comprises:
determining that an alert condition is present;
waiting for the bus to become free;
setting the bus interface of the IC from the transparent mode to the operational mode when the bus is free; and
transmitting an alert over the bus in response to the alert condition.

13. The method of claim 12, wherein the method further comprises:
receiving an alert clear;
resetting internal registers; and
receiving a baud calibration byte.

14. The method of claim 10, further comprising:
wherein the bus interface further comprises:
a first communication channel that is coupled to the input pin and an interface circuitry;
a second communication channel that is coupled to the interface circuitry; and
a switch that is coupled to the first communication channel, the second communication channel, and the output pin,
wherein the switch couples the first communication channel to the output pin in transparent mode, and
wherein the switch couples the second communication channel to the output pin in operational mode.

15. A system comprising:
a single-wire bus;
a master controller that is coupled to the single-wire bus, wherein the controller is adapted to transmit communications over the single-wire_bus and to receive data from the bus, and wherein each communication includes a command byte;
a plurality of slave ICs that are coupled in series with one another along the single-wire bus, wherein each slave IC includes:
an input pin that is coupled to the single-wire bus;
an output pin that is coupled to the single-wire bus;
a bus interface that is coupled between the input pin and the output pin, wherein the bus interface has a transparent mode and an operational mode; and
interface circuitry that is coupled to bus interface, wherein the interface circuitry is adapted to receive communications from the bus in both the transparent mode and the operational mode, and wherein the interface circuitry, upon receiving an initialization command byte, performs a self-addressing operation to identify a bus address for the IC, and wherein the interface circuitry, upon receiving a data movement command byte, sets the bus interface to operational mode, if an operation address associated with the data movement command matches the bus address, and performs a data movement, at least one IC having a plurality of circuitries coupled in series from an output of the bus bus interface in a return loop to an input of the bus interface, wherein the bus interface is configured to assign a bus address to a first interface circuitry of the plurality of interface circuitries, and wherein each interface circuitry is adapted to:

a) increment the value of a received bus address, and then convey that incremented value to a next interface circuitry and assigns that value to the next interface series-coupled interface circuitry, b) wherein each of the serially-coupled individually assigned interfaces is configured to receive communications from the bus in both the transparent mode and the operational mode, wherein the transparent and configurations modes are determined by comparing a communication signal to the incremented values of the received address.

16. The system of claim 15, wherein the IC further comprises functional circuitry that is coupled to the interface circuitry.

17. The system of claim 16, wherein the interface circuitry further comprises:
a state machine that is coupled to the bus interface, the switch, and the functional circuitry;
a configuration register that is coupled to the state machine;
an address register that is coupled to the state machine; and
a register bank that is coupled to the state machine, wherein the state machine is adapted to store data from the functional circuitry in the register bank.

18. The system of claim 17, wherein the interface circuitry is adapted to set the bus to the operational mode and transmit an alert when the bus is free.

19. The system of claim 18, wherein the data movement command byte is a read/write command byte comprising:
an individual/global bit;
an IC address field that includes the operation address;
a register pointer field; and
a read/write bit.

20. The IC of claim 19, wherein the single-wire bus further comprises a single-wire data bus, and wherein the IC further comprises a clock pin that is adapted to be coupled to a single-wire clock bus.

21. The system of claim 19, wherein the functional circuitry of at least one of the slave ICs further comprises a temperature sensor, and wherein the register bank further comprises:
a temperature result register;
a sensor configuration register;
a low temperature threshold register; and
a high temperature threshold register.

22. The system of claim 15, further comprising:
wherein the bus interface further comprises:
a first communication channel that is coupled to the input pin and the interface circuitry;
a second communication channel that is coupled to the interface circuitry;
a switch that is coupled to the first communication channel, the second communication channel, and the output pin, wherein the switch couples the first communication channel to the output pin in transparent mode, and wherein the switch couples the second communication channel to the output pin in operational mode.

23. An apparatus comprising:
means for receiving a communication by an input pin of an IC over a single-wire bus, wherein the communication includes a command byte;
mean for performing a self-addressing operation to identify a bus address for the IC if the command byte is an initialization command byte; and
means for performing a data movement operation if the command byte is a data movement command byte, wherein the data movement operation includes:
means for setting the bus interface of the IC from a transparent mode to an operational mode if an operation address from the command byte matches the bus address;
means for accessing a register identified in the command byte; and
means for performing data movement with the register,
the IC having a plurality of, circuitries coupled in series from an output of the bus bus interface in a return loop to an input of the bus interface,
wherein the bus interface is configured to assign a bus address to a first interface circuitry of the plurality of interface circuitries, and
wherein each interface circuitry is adapted to:
a) increment the value of a received bus address, and then convey that incremented value to a next interface circuitry and assigns that value to the next interface series-coupled interface circuitry,
b) wherein each of the serially-coupled individually assigned interfaces is configured to receive communications from the bus in both the transparent mode and the operational mode, wherein the transparent and configurations modes are determined by comparing a communication signal to the incremented values of the received address.

24. The apparatus of claim 23, wherein the means for performing self-addressing operation further comprise:
means for determining the bus address from the communication;
means for storing the bus address;
means for generating a modified bus address;
means for setting a bus interface of the IC from a transparent mode to an operational mode; and
means for transmitting the modified address through an output pin of the IC.

25. The apparatus of claim 23, wherein the apparatus further comprises:
means for determining that an alert condition is present;
means for waiting for the bus to become free;
means for setting the bus interface of the IC from the transparent mode to the operational mode when the bus is free; and
means for transmitting an alert over the bus in response to the alert condition.

26. The apparatus of claim 23, wherein the bus interface further comprises:
a first communication channel that is coupled to the input pin and an interface circuitry;
a second communication channel that is coupled to the interface circuitry; and
a switch that is coupled to the first communication channel, the second communication channel, and the output pin,
wherein the switch couples the first communication channel to the output pin in transparent mode, and wherein the switch couples the second communication channel to the output pin in operational mode.

27. A method comprising:
receiving a communication by an input pin for each of a plurality of ICs over a single-wire bus, wherein the communication includes a data movement command as its command byte;
if an operation address from the command byte matches the bus address, setting a bus interface of the matched IC from a transparent mode to an operational mode;
accessing a register in each of the plurality of ICs identified in the command byte; and
performing data movement with the register for each of the plurality of ICs in an order
the IC having a plurality of, circuitries coupled in series from an output of the bus bus interface in a return loop to an input of the bus interface,
wherein the bus interface is configured to assign a bus address to a first interface circuitry of the plurality of interface circuitries, and
wherein each interface circuitry is adapted to:
a) increment the value of a received bus address, and then convey that incremented value to a next interface circuitry and assigns that value to the next interface series-coupled interface circuitry,
b) wherein each of the serially-coupled individually assigned interfaces is configured to receive communications from the bus in both the transparent mode and the operational mode, wherein the transparent and configurations modes are determined by comparing a communication signal to the incremented values of the received address.

28. The method of claim 27, wherein the single-wire bus is a unidirectional bus that forms a ring that includes each of the plurality of ICs and a host controller, and wherein the step of performing further comprises performing data movement with the register for each of the plurality of ICs in a sequence that corresponds to an address on the ring.

29. The method of claim 28, wherein the data movement is a read operation.

30. The method of claim 27, wherein the single-wire bus is a bi-directional data bus, and wherein the method further comprises transmitting a clock signal across a clock bus to each of the plurality of ICs from a host controller.

31. The method of claim 27, wherein the bus interface further comprises:
a first communication channel that is coupled to the input pin and an interface circuitry;
a second communication channel that is coupled to the interface circuitry; and
a switch that is coupled to the first communication channel, the second communication channel, and the output pin, wherein the switch couples the first communication channel to the output pin in transparent mode, and
wherein the switch couples the second communication channel to the output pin in operational mode.

* * * * *